US012725719B2

(12) United States Patent
Brück et al.

(10) Patent No.: US 12,725,719 B2
(45) Date of Patent: Sep. 1, 2026

(54) SEGMENTED ELECTRICAL FEEDTHROUGH

(71) Applicant: Vitesco Technologies GmbH, Regensburg (DE)

(72) Inventors: Rolf Brück, Bergisch Gladbach (DE); Stefan Ahlers, Bergisch Gladbach (DE)

(73) Assignee: Vitesco Technologies GmbH, Regensburg (DE)

( * ) Notice: Subject to any disclaimer, the term of this patent is extended or adjusted under 35 U.S.C. 154(b) by 85 days.

(21) Appl. No.: 18/681,196

(22) PCT Filed: Jul. 20, 2022

(86) PCT No.: PCT/EP2022/070404
§ 371 (c)(1),
(2) Date: Feb. 5, 2024

(87) PCT Pub. No.: WO2023/011926
PCT Pub. Date: Feb. 9, 2023

(65) Prior Publication Data

US 2024/0282477 A1 Aug. 22, 2024

(30) Foreign Application Priority Data

Aug. 6, 2021 (DE) ..................... 10 2021 208 621.7

(51) Int. Cl.
*H01B 7/00* (2006.01)
*H01R 43/02* (2006.01)

(52) U.S. Cl.
CPC ....... *H01B 7/0009* (2013.01); *H01R 43/0263* (2013.01)

(58) Field of Classification Search
None
See application file for complete search history.

(56) References Cited

U.S. PATENT DOCUMENTS 3,317,654 A * 5/1967 Yonkers ............... H02G 15/068 174/73.1
3,920,307 A * 11/1975 Burns .................... H01R 13/53 218/90

(Continued)

FOREIGN PATENT DOCUMENTS

DE 19627840 1/1998
DE 69533609 10/2005

(Continued)

OTHER PUBLICATIONS

Office Action of corresponding German Patent Application No. DE 10 2021 208 621.7.

(Continued)

*Primary Examiner* — Krystal Robinson
(74) *Attorney, Agent, or Firm* — COZEN O'CONNOR

(57) ABSTRACT

A segmented electrical feedthrough for electrically contacting a heater conductor through a housing, having a contact portion and an insulation portion. The insulation portion has an electrical conductor, an insulation, and an outer sleeve, wherein the electrical conductor and the insulation are arranged within the outer sleeve and the electrical conductor is electrically insulated in relation to the outer sleeve by the insulation, wherein the contact portion is attached to the electrical conductor on a first end side, and the electrical conductor on the second end side thereof opposite the first end side is connectable to a heater conductor. The contact portion and the insulation portion are formed from two different elements which are durably connected to one another by a joining method.

11 Claims, 2 Drawing Sheets

(56) References Cited

U.S. PATENT DOCUMENTS

| | | | | | |
|---|---|---|---|---|---|
| 3,989,341 | A * | 11/1976 | Ball | H01R 13/53 439/819 |
| 4,199,213 | A * | 4/1980 | Tachick | H01H 33/76 439/185 |
| 4,780,577 | A * | 10/1988 | Toshima | H01B 17/36 174/31 R |
| 5,223,672 | A | 6/1993 | Grgas et al. | |
| 5,281,767 | A * | 1/1994 | West | H01B 17/26 174/152 R |
| 10,941,688 | B2 | 3/2021 | Hirth et al. | |
| 11,053,826 | B2 * | 7/2021 | Brugger | F01N 13/0097 |
| 11,440,079 | B1 * | 9/2022 | Schlipf | H01B 17/26 |
| 2010/0181088 | A1 | 7/2010 | Stolt et al. | |

FOREIGN PATENT DOCUMENTS

| | | | | |
|---|---|---|---|---|
| DE | 102012110098 A1 * | 4/2014 | F01N 3/2026 |
| DE | 102014210391 | 12/2015 | |
| DE | 102019210368 | 1/2021 | |
| DE | 102012110098 B4 | 3/2021 | |
| EP | 0848785 | 5/1999 | |
| JP | H0831481 | 2/1996 | |
| JP | 2004055370 | 2/2004 | |
| JP | 2015056334 | 3/2015 | |
| KR | 100496768 | 9/2005 | |
| WO | WO 03098748 | 11/2003 | |

OTHER PUBLICATIONS

Action of Corresponding Japanese Patent Application No. 2024-506939, dated Nov. 29, 2024.

Office Action of corresponding Japanese Patent Application No. 2024-506939, dated Mar. 26, 2025.

Office Action of corresponding Korean Patent Application No. 10-2024-7007345, dated Aug. 22, 2025.

Office Action of corresponding Chinese Patent Application No. 202280054852.1 dated Jun. 2, 2026.

* cited by examiner

SEGMENTED ELECTRICAL FEEDTHROUGH

CROSS REFERENCE TO RELATED APPLICATIONS

This is a U.S. national stage of Application No. PCT/EP2022/070404 filed Jul. 20, 2022. Priority is claimed on German Application No. DE 10 2021 208 621.7 filed Aug. 6, 2021, the content of which is incorporated herein by reference.

BACKGROUND OF THE INVENTION

1. Field of the Invention

The disclosure relates to a segmented electrical feedthrough for electrically contacting a heater conductor through a housing, having a contact portion and an insulation portion, wherein the insulation portion has an electrical conductor, insulation, and an outer sleeve, wherein the electrical conductor and the insulation are arranged within the outer sleeve and the electrical conductor is electrically insulated in relation to the outer sleeve by the insulation, wherein the contact portion is attached to the electrical conductor on a first end side, and the electrical conductor on the second end side thereof opposite the first end side is connectable to a heater conductor. Moreover, the disclosure relates to a method for producing the electrical feedthrough.

2. Description of the Related Art

Electric heating elements are typically used to heat exhaust gases in an exhaust gas section downstream of an internal combustion engine, or the exhaust gas flowing in an exhaust gas section, respectively. The objective herein is to faster achieve a temperature threshold from which an effective conversion of the pollutants carried in the exhaust gas can take place. This is necessary because the catalytically active surfaces of the catalysts installed in the exhaust gas section used for exhaust gas aftertreatment only allow a sufficient reaction of the respective pollutants from a minimum temperature, the so-called light-off temperature.

The known solutions in the state of the art include so-called heating catalysts, which have a metallic structure connected to a voltage source or a metallically coated ceramic structure, which can be heated while exploiting the ohmic resistance.

For the purpose of electrically contacting the heatable structure, an electrical conductor must be introduced at least one point through the housing of the exhaust gas section or a catalyst arranged in the exhaust gas section. It must be ensured that the feedthrough is gas-tight, that there is electrical insulation between the housing and the electrical conductor, and that sufficient durability is guaranteed. The electrical conductor is typically made of a compact solid material, such as a metallic bolt.

DE 10 2012 110 098 B4 discloses a method for producing an electrical feedthrough for the power supply of an electric exhaust gas heater in a motor vehicle. The feedthrough has an outer tube, the interior of the latter being penetrated by an electrical conductor. The electrical conductor protrudes beyond the outer tube on at least one of the end faces of the outer tube. In the interior of the outer tube, the electrical conductor is surrounded by an insulation material. The feedthrough is produced by cutting to length a compressed bar material, wherein regions of the portion functioning as the outer tube and of the portion functioning as the insulation material are removed by subtractive methods, so as to generate an electrical feedthrough of the desired length with a desired projection of the electrical conductor beyond the outer tube.

The disadvantage of the methods known in the prior art for producing an electrical feedthrough is in particular that the compressed bar material used is very costly because it has a multi-layer structure. Moreover, the subtractive machining to release the electrical conductor and to cut the electrical feedthrough to length destroys a significant proportion of approx. two-thirds of the bar material which is thus wasted by subtractive machining. As a result, the production process is particularly complex and cost intensive.

SUMMARY OF THE INVENTION

It is therefore an object of one aspect of the present invention to achieve a segmented electrical feedthrough and a suitable production method that allows a simplified and cost-effective production of the electrical feedthrough with at least equal technical properties.

One exemplary aspect of the invention relates to a segmented electrical feedthrough for electrically contacting a heater conductor through a housing, having a contact portion and an insulation portion, wherein the insulation portion has an electrical conductor, an insulation, and an outer sleeve, wherein the electrical conductor and the insulation are arranged within the outer sleeve and the electrical conductor is electrically insulated in relation to the outer sleeve by the insulation, wherein the contact portion is attached to the electrical conductor on a first end side, and the electrical conductor on the second end side thereof opposite the first end side is connectable to a heater conductor, wherein the contact portion and the insulation portion are formed from two different elements which are durably connected to one another by a joining method.

The electrical feedthrough serves to guide an electrical conductor through a housing of an exhaust line or a catalytic converter. The feedthrough must be resistant to the occurring temperatures and be gas-tight so that no exhaust gas can escape. The electrical conductor should be electrically isolated from the housing so that a short circuit cannot occur.

Electrical feedthroughs on the outside of the housing typically have a connection point to a current-conducting line. This connection point is typically formed by a threaded bolt, which is part of the electrical conductor of the feedthrough. The current-conducting line is screwed to the electrical conductor of the feedthrough using a suitable plug.

The contact portion is the portion where the connection with a current-conducting line can be generated on the one hand, and on the other hand a connection to the electrical conductor of the insulation portion can be established.

The contact portion preferably has a conical region which has an external thread. The plug of the current-conducting line can be screwed to this external thread and durably fixed thereon. The conical design embodiment of this region assists in assembling the plug by way of a self-centering effect.

The contact portion is connected to the electrical conductor of the insulation area by a durable joining method, in particular by soldering or welding.

The insulation portion per se is formed from a composite material that has a cylindrical electrical conductor in the center, which is surrounded by an insulation material by way of which said electrical conductor is isolated from the metallic outer sleeve. In a preferred embodiment, the three different regions have an identical axial extent, so that the insulation portion can be cut off to a length matching the application from a suitable bar material. In this way, waste or material lost due to subtractive machining is largely avoided.

The electrical conductor is preferably formed from a steel such as 2.4869. The chosen material of the electrical conductor and the contact portion can be identical or different; in any case the oxidation resistance and the specific electrical resistance should be comparable or similar. For example, the insulation is formed from oxide ceramics. The outer sleeve can likewise be formed from a steel material. The material of the outer sleeve and of the electrical conductor can, but does not have to, be identical.

In one aspect, it can be provided that the electrical conductor projects somewhat, preferably only a few millimeters, beyond the insulation material and/or the outer sleeve on one side in the axial direction. This can be achieved by a subtractive method, whereby particular attention is paid to removing as little material as possible from the outer sleeve and the insulation material. Therefore, the projection of the electrical conductor is limited to a few millimeters.

The projection of the electrical conductor is preferably arranged on that side of the insulation portion which in the assembled state faces the heater conductor arranged in the interior. This non-symmetrical design also allows the specification of a unequivocal orientation of the insulation portion relative to the contact portion to be achieved, thereby simplifying assembling and avoiding assembly errors.

It is particularly advantageous for the contact portion to have a conical portion and a cylindrical portion, wherein the cylindrical portion forms the interface to the insulation portion.

The cylindrical portion of the contact portion is particularly advantageous because the electrical conductor in the insulation portion most typically also has a cylindrical cross section. This makes it particularly easy to attach the contact portion to the insulation portion. Preferably, the cylindrical portion is aligned so as to be concentric with the electrical conductor. The cylindrical portion can preferably have the same diameter as the electrical conductor. In a particularly preferred alternative design embodiment, the cylindrical portion can also have a slightly smaller diameter than the electrical conductor, as a result of which the assembly is simplified and it is ensured that the cylindrical portion does not come into contact with the insulation material and, most particularly, does not come into electrically conductive contact with the outer sleeve.

The conical portion can preferably be designed in such a manner that screwing a plug onto said conical portion is as simple as possible. Preferably, the conical portion and the cylindrical portion have a common central axis. In alternative design embodiments, the conical portion could also be set at an angle to the central axis of the cylindrical portion, for example.

It is also advantageous for the insulation portion to be formed from a composite material, wherein the latter has an internal electrical conductor which is surrounded in the circumferential direction by an electrical insulation material arranged in the manner of a sleeve, wherein the internal electrical conductor and the electrical insulation material are surrounded by a metallic outer sleeve.

Such a composite material can be produced easily and on a large scale. Cutting the composite material to length can be performed by simple separating methods with small amounts of material offcuts. The thickness of the electrical conductor, of the insulation layer and of the outer sleeve, as well as of the selected materials, can easily be varied.

A preferred exemplary aspect is characterized in that the insulation portion has a first end side and a second end side, wherein the first end side forms the interface to the contact portion of the electrical feedthrough and the second end side forms the interface to the heater conductor and/or a connection portion.

The insulation portion follows the contact portion in the direction of the current flow, and the heater conductor to be energized follows the insulation portion. The insulation portion, more specifically the electrical conductor in the insulation portion, has for this purpose two end sides to which can be attached the contact portion, on the one hand, and furthermore the heater conductor to be energized. Since the insulation portion is preferably produced from a bar material, the end sides are preferably parallel to one another and opposite one another.

It is also to be preferred if the feedthrough has a connection portion which is arranged on the second end side of the insulation portion and is durably connected to the electrical conductor of the insulation portion.

An additional connection portion is formed in particular by a disk-shaped or cylindrical element, which can be applied to the end side of the insulation portion facing away from the contact portion. The spacing between the insulation portion and the heater conductor is increased by the connection portion. This is particularly advantageous if the electrical conductor does not project beyond the insulation material and the outer sleeve. The element forming the connection portion can also have a special shape on the side facing the heater conductor, so as to be more easily connected to the heater conductor. For example, a structured surface, or a surface set at an angle, or a curved surface is conceivable. Preferably, the face of the connection portion facing away from the insulation portion is adapted to the shape of the heater conductor to be contacted.

Moreover, it is advantageous for the electrical conductor, the insulation, and the outer sleeve to have identical axial extents, and for the end regions of the elements to terminate flush with one another. This is particularly advantageous for a simple and material-friendly production of the insulation portion.

The object in terms of the method is achieved by a method having the features of claim 7.

One exemplary aspect of the invention relates to a method for producing a segmented electrical feedthrough, wherein the contact portion and the insulation portion are durably connected to one another by a joining method, wherein the contact portion and the insulation portion are durably connected to one another on the first end side of the insulation portion.

A particular advantage of this method according to one aspect of the invention is that the insulation portion, which on the outer sleeve is connected to the housing through which the electrical conductor is to be guided, can be produced in a particularly simple and material-friendly manner. Since the composite material used is expensive and the steps otherwise required for subtractive machining demand long tooling times and thus production time, the use of easy-to-assemble and quick-to-produce insulation portions is particularly advantageous.

In order to achieve a fully functional electrical feedthrough, it is necessary to achieve an attachment point for the plug and to enable the heater conductor to be attached on the other side of the insulation portion. The segmented design allows in particular the cost-effective and simple production of the individual portions of the electrical feedthrough. The individual portions can be joined to form a stable and durable electrical feedthrough by way of a joining method such as, in particular, soldering.

Soldering is in particular an advantageous joining method because soldering procedures take place anyway in soldering furnaces in the manufacture of the honeycomb bodies for catalysts, whereby the portions of the electrical feedthrough can be connected in a simple manner.

Moreover, it is advantageous for the contact portion and the insulation portion to be aligned with one another in such a way that the contact portion is in electrically conductive contact only with the electrical conductor of the insulation area. Particularly preferably, the electrical conductor and the contact portion are aligned so as to be mutually concentric.

Furthermore, it is expedient for the contact portion and the insulation portion to be mutually fixed by fixing before the joining method for generating the durable connection is carried out.

For example, fixing can be a sleeve into which the elements are placed to achieve a predetermined relative positioning. Such a sleeve, which may also be referred to as a mold, can be formed, for example, from graphite or ceramics, or by a ceramic-coated metal. Preferably, the sleeve is constructed in such a manner that it survives a soldering procedure without damage and allows simple releasing of the elements after the soldering procedure.

Alternatively, the individual elements can have threads, reciprocating internal and external threads, so that they can be soldered and screwed to one another at the contact points.

Alternatively, the elements can have bores in which fitting pieces are inserted, this allowing the elements to be positioned unequivocally relative to one another. After the soldering procedure, the fitting pieces remain in the bores and thus become part of the electrical conductor.

Another alternative could be the precise press-fitting of the elements. Here, too, a solder is applied to the each of later contact faces between the elements, said solder generating the connection between the elements in the subsequent soldering procedure.

In particular, the contact faces between the elements, especially between the electrical conductor and the contact portion, and between the electrical conductor and the connection portion, if such a connection is provided, can be post-processed in such a manner that, in addition to the materially integral connection generated during soldering, a form-fitting connection is also achieved. Mortise connections, a structured surface, interlocking elements, or protrusions and shoulder which generate a form-fit, can in particular be provided for this purpose.

It is also advantageous for the contact portion with the conical region facing downward to be inserted into an accurately fitting mold, wherein the interface arranged on the cylindrical region is first coated with a solder before the insulation portion by way of the first end side is placed on the contact portion in such a manner that the contact portion is in conductive contact only with the electrical conductor, whereby the mold with the inserted parts and the solder layer is subsequently subjected to a soldering procedure.

The soldering procedure is preferably carried out in a soldering furnace which is also used for soldering the metallic honeycomb bodies of the catalysts. This creates an economy in terms of the process because the soldering procedures can take place in parallel.

The mold is successively populated with the elements that form the electrical feedthrough, whereby the solder is applied to the respective envisaged contact surfaces between the elements. The elements fixed and accordingly applied with a solder in the mold are finally heated to the required temperature in an appropriate furnace, so that the solder melts and a durable connection is generated.

The electrical conductor and the solder used are preferably nickel-based. In particular, the bolt forming the electrical conductor is preferably produced predominantly from nickel.

Moreover, it is preferable for the connection portion to be placed on the second end side of the insulation portion once the second end side has been coated with a solder and before the mold with the inserted parts is subjected to the soldering procedure.

Depending on the design of the insulation portion, in particular of the electrical conductor, the provision of a connection portion is necessary to generate a sufficient spacing between the heater conductor and the outer sleeve, so as to prevent electrical short circuits. The contact point between the electrical conductor and the connection portion is also soldered accordingly before the entire assembly is subjected to the soldering procedure.

Advantageous refinements of the present invention are described in the dependent claims and in the following description of the figures.

BRIEF DESCRIPTION OF THE DRAWINGS

The invention will be explained in detail hereunder by exemplary embodiments with reference to the drawings. In the drawings.

DETAILED DESCRIPTION OF THE PRESENTLY PREFERRED EMBODIMENTS

Figure 1:
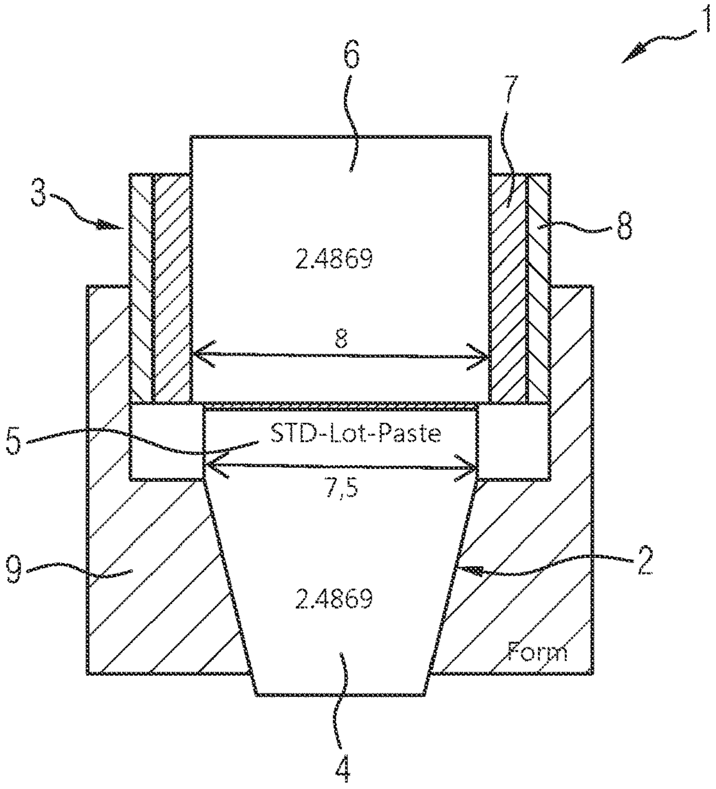
FIG. 1 is a sectional view through a segmented electrical feedthrough, wherein the electrical conductor projects beyond the insulation material and the outer sleeve on one side in the axial direction.

FIG. 1 shows a segmented electrical feedthrough 1. The feedthrough 1 is formed from a contact portion 2 and an insulation portion 3. The contact portion 2 has a conical portion 4 which can support an external thread in order to screw a corresponding plug (not shown) to the contact portion 2. Furthermore, the contact portion 2 has a cylindrical portion 5 which adjoins the conical portion 4 and forms the contact point to the electrical conductor 6 of the insulation portion 3.

The contact portion is preferably formed from an electrically highly conductive material which is characterized by a high oxidation resistance and a low specific electrical resistance. A preferred material is the steel type 2.4869, for example.

The insulation portion 3 adjoins the contact portion 2. As can be seen in FIG. 1, the insulation portion 3 is formed from the electrical conductor 6, the insulation material 7 and the outer sleeve 8. The electrical conductor 6 preferably has a slightly larger diameter than the cylindrical portion 5. In the example shown in FIG. 1, the cylindrical portion has a diameter of 7.5 millimeters, while the electrical conductor 6 has a diameter of 8 millimeters. The dimensions are exemplary, but give an impression of the preferred size ratios.

In FIG. 1, the electrical conductor 6 has a longer axial extent than the insulation material 7 and the outer sleeve 8. Thus, a projection of the electrical conductor 6 is achieved, as a result of which the attachment of the heater conductor not shown is simplified.

The projection of the electrical conductor 6 can be achieved, for example, by subtractive machining of the outer sleeve 8 and the insulation material 7.

Furthermore shown in FIG. 1 is the mold 9 which is used to correctly position the individual elements of the segmented electrical feedthrough relative to one another before the soldering procedure. For this purpose, the mold 9 has clearances which are adapted to the individual elements and enforce an unequivocal mutual positioning of the elements.

Figure 2:
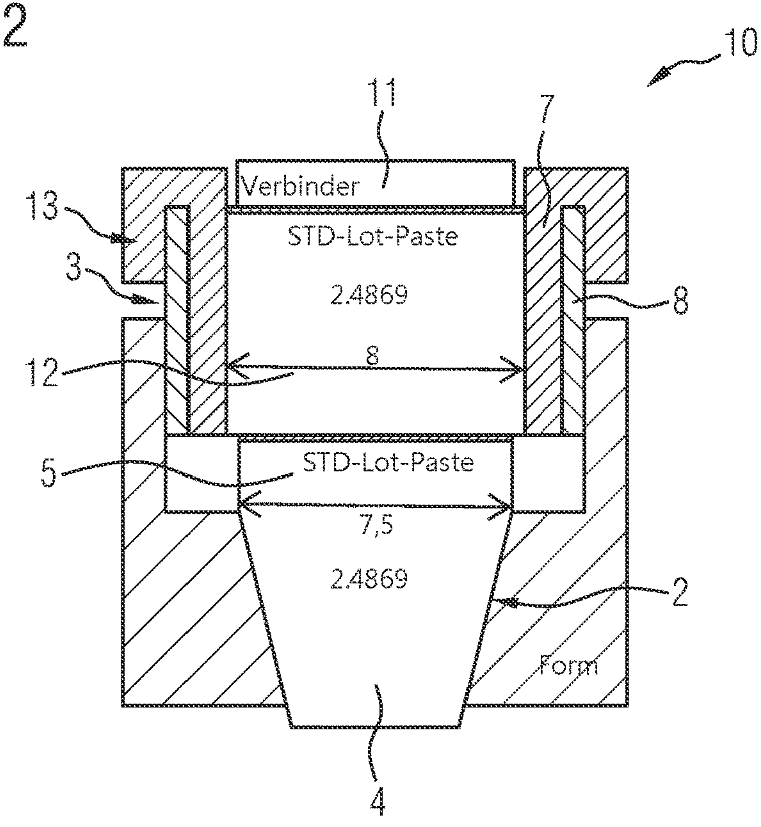
FIG. 2 is a sectional view through an alternatively designed segmented electrical feedthrough, wherein the electrical conductor has the same axial extent as the insulation material and the outer sleeve, wherein a connection portion, which serves as a connection point to the heater conductor not shown, is attached to the electrical conductor.

FIG. 2 shows an alternative exemplary embodiment of a segmented electrical feedthrough 10. Elements which are identical to those in FIG. 1 have the same reference signs.

In contrast to FIG. 1, the electrical feedthrough 10 additionally has a connection portion 11, which is attached to the electrical conductor 12 on the end side facing away from the contact portion. The electrical conductor 12 in the exemplary embodiment of FIG. 2 does not project beyond the insulation material 7 and the outer sleeve 8. In order to nevertheless guarantee a sufficient spacing between the heater conductor not shown and the outer sleeve 8, the cylindrical connection portion 11 is attached to the electrical conductor 12. This is also done by applying solder to the contact point and subsequent soldering. The connection portion 11, like the contact portion 3, also has a smaller diameter than the electrical conductor 12.

The mold 13 is enhanced in such a way that the connection portion 11 is also positioned unequivocally in relation to the other elements and is fixed for the soldering procedure.

Figure 3:
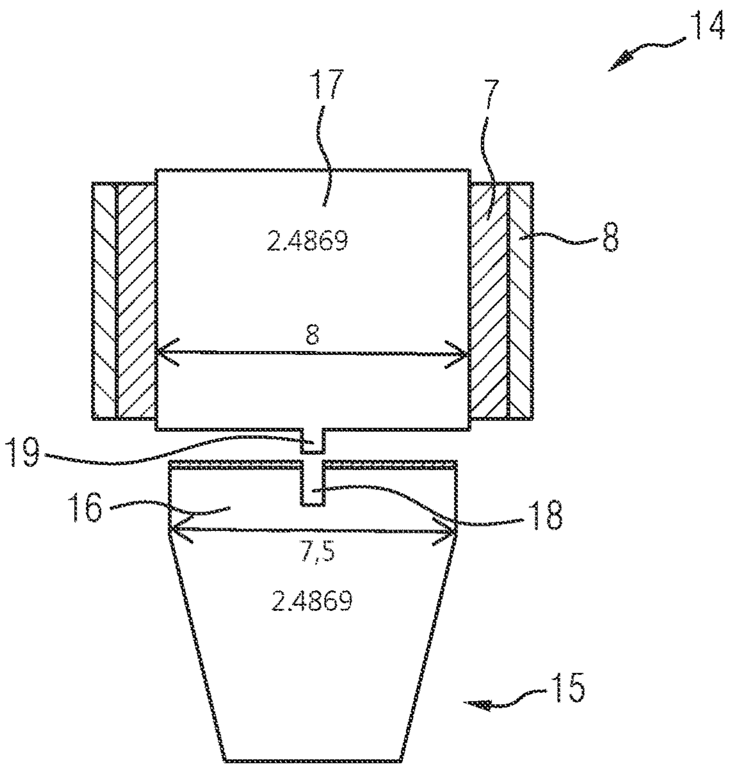
FIG. 3 is a sectional view through an alternatively designed segmented electrical feedthrough, wherein a form-fitting connection is additionally provided between the insulation portion and the contact portion.

FIG. 3 shows an alternatively designed segmented electrical feedthrough 14. The outer sleeve 8 and the insulation material 7 are configured as in FIG. 1. The contact portion 15 has a clearance 18 in the cylindrical portion 16, which forms the interface to the electrical conductor 17. The clearance 18 is centrally arranged. The electrical conductor 17 has a pin 19 which corresponds to the clearance 18. During assembly, the pin 19 is inserted into the clearance 18, whereby a form-fitting connection is formed and thus at least relative movements in the radial direction are prevented.

If the pin 19 forms an interference fit or an overfit in relation to the clearance 18, fixing in the axial direction can also be generated when the two elements are mutually compressed, i.e. the pin 19 is pressed into the clearance 18.

Figure 4:
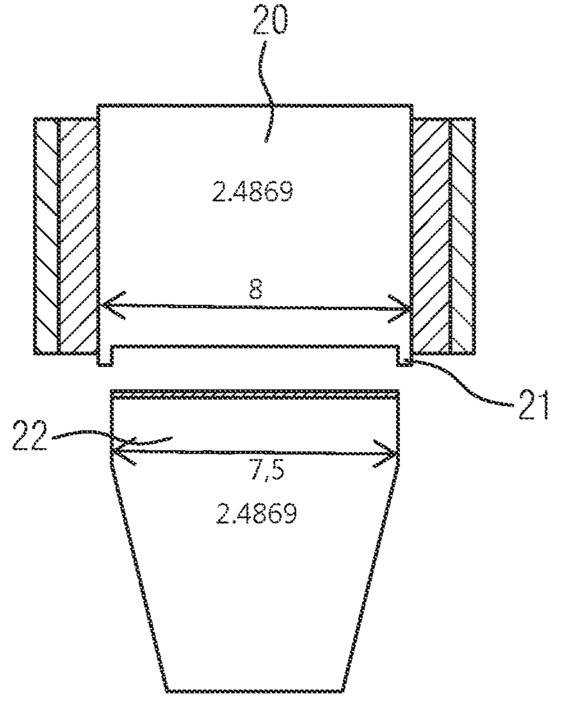
FIG. 4 is a sectional view through a further alternatively designed segmented electrical feedthrough, wherein a different connection is provided between the insulation portion and the contact portion.

FIG. 4 shows an alternative design embodiment of the connection between the electrical conductor 20 and the cylindrical portion 22 of the contact portion. Here, the electrical conductor 20 has a plurality of pins 21, or a completely or partially encircling periphery, on the outer radial circumference. The cylindrical portion can be inserted into the receptacle thus configured on the electrical conductor 20, this guaranteeing at least fixing in the radial direction or also additionally achieving fixing in the axial direction if an interference fit is present.

The different features of the individual exemplary embodiments can also be combined with one another.

The exemplary embodiments in FIGS. 1 and 4 are in particular not of a limiting nature and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical feedthrough configured to electrically contact a heater conductor through a wall of a housing, comprising: a contact portion; an insulation portion, wherein the insulation portion comprises: an electrical conductor; an insulation; and an outer sleeve, wherein the electrical conductor and the insulation are arranged within the outer sleeve and the electrical conductor is electrically insulated in relation to the outer sleeve by the insulation, wherein the contact portion is attached to the electrical conductor on a first end side, and the electrical conductor on a second end side opposite the first end side is connected to the heater conductor, wherein the contact portion and the insulation portion are separate assemblies that are connected to one another by a joining method.

2. The electrical feedthrough as claimed in claim 1, wherein the contact portion has a conical portion and a cylindrical portion, wherein the cylindrical portion forms an interface to the insulation portion.

3. The electrical feedthrough as claimed in claim 1, wherein the insulation portion is formed from a composite material, having an internal electrical conductor circumferentially surrounded by the insulation configures as an electrical insulation material arranged as a sleeve, wherein the internal electrical conductor and the electrical insulation material are surrounded by a metallic outer sleeve.

4. The electrical feedthrough as claimed in claim 1, wherein the insulation portion has a first end side and a second end side, wherein the first end side forms an interface to the contact portion of the electrical feedthrough and the second end side forms the interface to the heater conductor and/or a connection portion.

5. The electrical feedthrough as claimed in claim 4, wherein the feedthrough has a connection portion arranged on the second end side of the insulation portion and is connected to the electrical conductor of the insulation portion.

6. The electrical feedthrough as claimed in claim 1, wherein the electrical conductor, the insulation, and the outer sleeve have identical axial extents and respective end regions of the electrical conductor, the insulation, and the outer sleeve terminate flush with one other.

7. A method for producing electrical feedthrough having a contact portion, an insulation portion, wherein the insulation portion has an electrical conductor, an insulation, and an outer sleeve, wherein the electrical conductor and the insulation are arranged within the outer sleeve and the electrical conductor is electrically insulated in relation to the outer sleeve by the insulation, wherein the contact portion is configured to be attached to the electrical conductor on a first end side, and the electrical conductor on a second end side opposite the first end side is connected to a heater conductor, wherein the contact portion and the insulation portion are separate assemblies, comprising: connecting the contact portion and the electrical conductor of the insulation portion to one another by a joining method; and connecting the contact portion and the insulation portion to one another on a first end side of the insulation portion.

8. The method as claimed in claim 7, wherein the contact portion and the insulation portion are aligned with one another in such a way that the contact portion is in electrically conductive contact only with the electrical conductor of the insulation portion.

9. The method as claimed in claim 7, wherein the contact portion and the insulation portion are mutually fixed by a fixing mold before the joining method for generating the connection is carried out.

10. The method as claimed in claim 7, further comprising:

inserting the contact portion with a conical region facing downward into an accurately fitting mold, wherein an interface arranged on a cylindrical region is first coated with a solder layer before the insulation portion by way of the first end side is placed on the contact portion in such a manner that the contact portion is in conductive contact only with the electrical conductor, whereby the mold with the inserted parts and the solder layer is subsequently subjected to a soldering procedure.

11. The method as claimed in claim 10, wherein the connection portion is placed on the second end side of the insulation portion once the second end side has been coated with a solder and before the mold with the inserted parts is subjected to the soldering procedure.

* * * * *